(12) United States Patent
Lafond et al.

(10) Patent No.: US 7,347,137 B2
(45) Date of Patent: Mar. 25, 2008

(54) ESPRESSO COFFEEMAKER WITH REMOVABLE WATER RESERVOIR

(75) Inventors: Jean Marie Lafond, Ibos (FR); Patrick Charles, Louey (FR); Alexandre Rouches, Horgues (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/518,354

(22) PCT Filed: May 27, 2003

(86) PCT No.: PCT/FR03/01593

§ 371 (c)(1),
(2), (4) Date: Dec. 17, 2004

(87) PCT Pub. No.: WO04/000083

PCT Pub. Date: Dec. 31, 2003

(65) Prior Publication Data

US 2005/0247204 A1    Nov. 10, 2005

(30) Foreign Application Priority Data

Jun. 19, 2002    (FR) .................................. 02 07557

(51) Int. Cl.
A47J 31/36    (2006.01)
(52) U.S. Cl. ........................ 99/281; 99/293; 99/299; 99/302 R
(58) Field of Classification Search .......... 99/280–283, 99/287–303, 279, 452, 495, 305–307; 426/433
See application file for complete search history.

(56) References Cited

U.S. PATENT DOCUMENTS

| 2,715,868 A | * | 8/1955 | Brown | 99/302 R |
| 2,935,011 A | * | 5/1960 | Perlman | 99/283 |
| 3,085,495 A | * | 4/1963 | Rosander | 99/283 |
| 3,098,424 A | * | 7/1963 | Perucca | 99/302 R |
| 3,278,087 A | * | 10/1966 | Stasse | 222/146.5 |
| 3,423,209 A | * | 1/1969 | Weber | 426/433 |
| 3,927,802 A | | 12/1975 | Lavochkin et al. | |
| 4,253,385 A | * | 3/1981 | Illy | 99/281 |
| 5,372,061 A | * | 12/1994 | Albert et al. | 99/281 |
| 5,566,605 A | * | 10/1996 | Lebrun et al. | 99/302 C |
| 5,636,563 A | * | 6/1997 | Oppermann et al. | 99/285 |
| 6,000,317 A | * | 12/1999 | Van Der Meer | 99/282 |
| 6,600,875 B2 | * | 7/2003 | Kodden et al. | 392/471 |
| 2003/0037680 A1 | * | 2/2003 | Rolland | 99/279 |

FOREIGN PATENT DOCUMENTS

| EP | 1147730 A1 | * | 10/2001 |
| FR | 2 292 662 A | | 6/1976 |
| FR | 2 316 901 A | | 2/1977 |
| FR | 2 544 604 A | | 10/1984 |

* cited by examiner

Primary Examiner—Timothy F. Simone
(74) Attorney, Agent, or Firm—Browdy and Neimark, PLLC

(57) ABSTRACT

The invention concerns an espresso coffeemaker having a removable water reservoir (4) connected to a main hydraulic circuit including a pump which sucks up water from the reservoir (4) and sends it into a heating unit and hence through the ground coffee contained in a filter-holder, said reservoir (4) being also connected to a return water hydraulic circuit exiting from the heating unit. The invention is characterized in that the device (28) connecting said reservoir (4) to said hydraulic circuits comprises means for expanding (49) the water jet returning through the hydraulic circuit to the reservoir and means for directing (44) said jet to a storage zone.

15 Claims, 4 Drawing Sheets

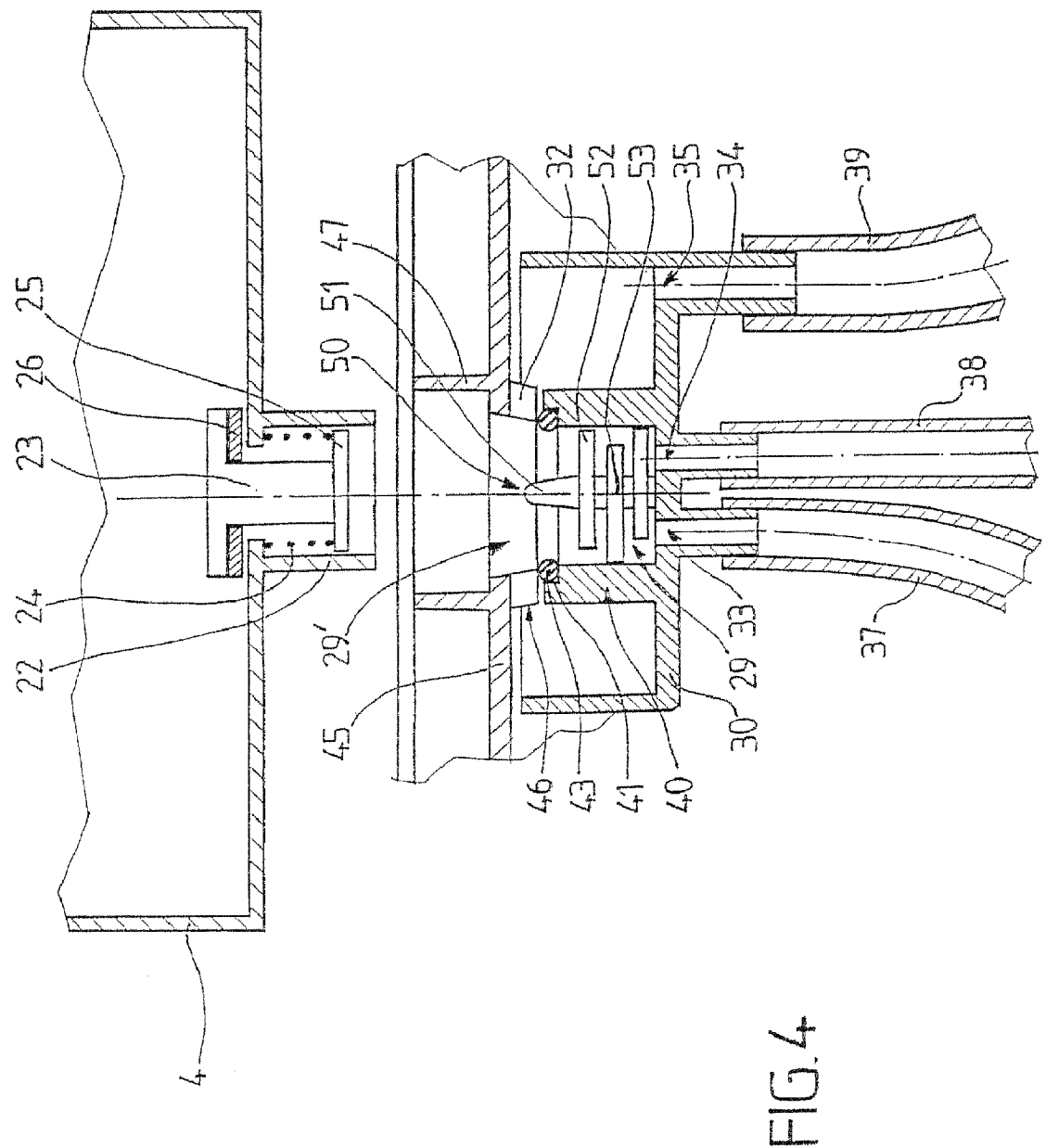

ESPRESSO COFFEEMAKER WITH REMOVABLE WATER RESERVOIR

The present invention relates to electric espresso coffeemakers having a cold water reservoir, an electric pump, a unit forming a boiler and a filter container intended to receive the coffee grounds that will be infused by hot water under pressure coming from the boiler.

The whole of the boiler, hereafter called the heating unit, generally consists of an electric heater in thermal relation with a water circuit, water being put in circulation during the operation of the pump. At the end of the cycle of preparation of the coffee beverage, it is necessary to carry out a release of pressure in the hydraulic circuit of the machine, this release being effected for the great majority of coffeemakers by redirecting the water flow under pressure towards the cold water reservoir, which thus receives the return.

Such a coffeemaker is known from the document FR 2 316 901 where a pump is installed in the base of the machine and a cold water reservoir in the vertical column connecting the base to the upper part of the machine. The reservoir is removably installed by being positioned in a mounting belonging to the base of the machine. The mounting receiving the removable reservoir presents a cylindrical bore in the upper part intended to communicate with the outlet opening of the reservoir and a bottom communicating with two pipes turned to the bottom connected one to the aspiration conduit of the pump and the other with a return conduit in the reservoir. Functioning satisfactorily, it has been realized that, in the situation where the user withdraws the reservoir from its seat in an inopportune way at the time when a hot water flow under pressure arrives towards the reservoir, the return occurs in the form of a powerful and hot jet and the projected splashes are then likely to burn the user. Moreover, there is a rejection onto the work surface of a significant quantity of hot water.

In order to mitigate this problem, some solutions have been envisioned consisting of, for example, use of an electronic circuit using a sensor for detection of the presence of the reservoir, information from the sensor being then used by this circuit to control the operating cycle of the machine. These solutions complicate the manufacture of a coffeemaker and increase the manufacturing cost.

A simplified solution is described in the document FR 2 544 604 where the weight of the reservoir pushes a control stick that actuates a switch of the electric circuit of the machine, making possible the operation of the latter only starting from a preestablished weight. However, the simple detection of the weight of the reservoir is not enough to ensure a correct return of the water flow under pressure towards the reservoir, it still is necessary that the latter be correctly positioned. For lack of a correct connection of a removable reservoir with its seat ensuring sealing, overflows of the return flow accumulate around the seat of the reservoir causing dirtying escapes and cleaning problems thereafter.

The goal of this invention is to remedy the above mentioned disadvantages and to propose an espresso coffeemaker with a removable reservoir that functions effectively while ensuring an increased protection of the user when using the machine.

Another goal of the invention is an espresso coffeemaker that is easy to maintain, avoiding any problem of overflow or uncontrolled flow of water when the removable reservoir is handled by the user.

An additional goal of the invention is an espresso coffeemaker of simple and inexpensive construction, while being reliable in operation.

These goals are reached with an espresso coffeemaker presenting a removable reservoir connected to a principal hydraulic circuit having a pump that aspirates the water from the reservoir and sends it into a heating unit and from there through the coffee grounds contained in a filter holder, said reservoir being also connected to a hydraulic circuit allowing the return of water leaving the heating unit, by the fact that the device for connection of said reservoir with said hydraulic circuits has means for reducing the pressure of the water jet arriving by the hydraulic return circuit to the reservoir and means for directing said jet towards a storage zone.

Thus, this connection device first of all ensures a fluid tight communication between the cold water reservoir of the machine and the remainder of the hydraulic circuit. This fluid tight connection can be realized by an O-ring belonging to the connection device or to the reservoir, joint located between two return pipes of the two parts in communication. The pipe of the reservoir generally has a valve that closes access to the reservoir automatically when it is removed from its seat and that opens the passage towards the hydraulic circuit of the machine when the reservoir is put back in place.

The connection device also has the role of placing the cold water reservoir in communication with the principal hydraulic circuit, which connects it to the aspiration conduit of the pump, as well as with the circuit for return towards the reservoir by a pressure reduction conduit.

According to the invention, the connection device has first means for reducing the pressure of the water jet which returns towards the reservoir. During operation of the machine, more particularly at the end of the cycle of preparation of the coffee beverage, the pressure must be lowered in the outgoing hydraulic circuit of the heating unit and for this reason, the hot water flow is returned by the pressure reduction conduit towards the reservoir. If the reservoir is in communication with the pressure reduction conduit, this flow returns into the reservoir. On the other hand, if the reservoir is not in place, the powerful return flow is quelled in any case by said first means which has for its effect to obtain a gentler jet and to thus protect the user against splashes from hot water under pressure.

The connection device of the invention has moreover second means for directing the return water flow towards a storage zone. Thus, the gentle jet obtained with the first means is then directed towards a zone making it possible to collect this return flow, in particular in the case where the reservoir is absent or if it is badly positioned or even, if for an unspecified reason, the seal between the latter and the connection device is broken. This makes it possible to avoid overflows outside the machine or prevent the accumulation of stagnant water inside the latter in zones that are difficult to reach for cleaning.

Advantageously, the pressure reduction means direct the water jet in a direction other than that of the principal axis of the connection device of said reservoir with the hydraulic circuits of the machine.

By principal axis of the connection device of the reservoir one understands in particular the axis of the pipe of the reservoir where the valve is arranged, even the valve axis. This axis is, for the majority of applications, vertical or normal to the work surface, but it also can be arranged in another direction. The fact of directing the return water jet in a direction different from that of the principal axis of the connection device for the reservoir, causes the powerful jet to undergo a pressure loss and at the same time it is deflected from the direction normal to the work surface or to the support surface of the connection device, causing it to thus protect the user when the return jet occurs in the absence of the reservoir.

Preferably, said connection device has a central bore putting it in communication on one side with said reservoir, from the other side the bore emerging into two openings, one communicating with the principal hydraulic circuit and the other with the hydraulic return circuit, where said means for reducing the pressure of the water jet are arranged in the prolongation of the axis of the opening which communicates with the hydraulic return circuit.

Thus, the turbulent jet that arrives by the return circuit in the opening provided for this purpose in the connection device is calmed by the pressure reduction means that are arranged in the axis of this opening having thus a direct effect on the powerful jet under pressure. This return jet undergoes a pressure loss coming in contact with pressure reduction means, which makes it less dangerous for the user.

Usefully, said pressure reduction means have a plurality of parallel blades arranged in alternation on a common axis.

These blades constitute a buffer device for the powerful return jet and, by their arrangement on an axis emerging into the inlet opening of the water return jet, force this water jet to follow a sinuous course having for effect a significant pressure loss and obtaining of a sufficiently calm water jet to be able to be directed or recovered thereafter.

Advantageously, said common axis has a deflector located in the axis of the valve for closing the reservoir when the latter is connected to the connection device.

Thus, with a deflector located on the axis supporting the blades ensuring reducing the pressure of the water flow, in particular at the upper part of this axis facing the water reservoir, one ensures the opening of the valve for closing the reservoir at the time of its installation in the connection device in a simple way, without requiring an additional part to place the reservoir in communication with the remainder of the hydraulic circuit of the machine.

Preferably, said means for directing the water jet are arranged downstream of said means for reducing the pressure of the water jet in the direction of flow of the latter.

One could have imagined to initially direct the turbulent water jet towards a recovery zone and to then reduce the pressure, but it was observed that it is more advantageous to reduce the pressure first, because a calm water jet is easier to channel thereafter towards a recovery or storage zone.

Advantageously, said means for directing the water jet have at least one passage placing the interior of the bore of the connection device in communication with a funnel surrounding said bore.

Thus, the water jet whose pressure is reduced inside the central bore of the connection device is directed towards a space close to this bore and concentric with the latter, a passage being provided to establish a communication between said spaces containing the fluid that is returning towards the reservoir.

Preferably, said means for directing the water jet of the coffeemaker of the invention have a first passage located downstream from an O-ring forming a seal between the reservoir and the bore of the connection device as seen in the direction of flow of the water jet returning towards the reservoir.

Thus, when the reservoir is installed and the O-ring carries out the sealing between the reservoir and the central bore of the connection device, the return jet is conducted back into the reservoir. On the other hand, if the reservoir is absent or is badly positioned, the seal no longer ensure its role, with the result that the water return jet is directed by a passage located just to one side and downstream from the seal into a storage zone constituted by the funnel surrounding said bore. This first passage can be arranged at the upper edge of said bore or by forming an opening located closer to the site of the seal so that the return jet will not have to follow a long path before reaching the storage zone.

Preferably, said first passage is provided between the upper part of the bore and the internal face of a plate affixed on the funnel.

In this configuration, a plate is provided in the upper part of the funnel, at least an opening being provided between the two with the result that the water return jet follows this opening to reach the interior of the funnel. The water jet is thus easily channeled towards the funnel closed by said plate, which avoids any overflow or splashing inside the latter, for example following projections touching the internal walls of the funnel, etc.

Usefully, said means for directing the water jet have a second passage in the form of an opening formed in the plate, opening located downstream from the first passage as seen in the direction of flow of the water return jet towards the reservoir.

Thus, if the water return jet is not sufficiently slowed down by the pressure reduction means, overflows can arise and pass this first passage. These overflows are then collected by said opening located at a higher level with respect to the first passage in the direction of flow of the water jet, which ensures even more control of the water return jet, making it possible to channel it towards the funnel even in the event of unexpected increase in the pressure of the latter.

Advantageously, said means for directing the water jet comprise channeling ribs located on both sides of an opening of the plate communicating with the bore of the connection device, ribs arriving in proximity to said opening.

Thus, said possible overflows crossing the bore of the connection device arrive on the upper face of the plate provided with channeling ribs which collect these overflows and channel them towards said opening emerging into the funnel which collects these overflows.

Usefully, said means for directing the water jet communicate through an evacuation opening of the funnel with a recuperation tank removably mounted in the machine.

Thus, the overflows stored temporarily in the funnel are conducted back towards a recuperation tank of larger dimensions than the funnel and which, in addition, is mounted in a removable manner with respect to the body of the machine making it possible for the user to easily empty it. Said recuperation tank comprises a prolongation in the form of a gutter forming a recuperator coming under a recuperator nozzle to which is connected a pipe for evacuation of the funnel.

Advantageously, said recuperation tank maintains the support for the infusion collecting container.

The infusion collecting container support is in the form of a grid maintained on its circumference by the edge of the recuperation tank. This makes it possible to collect in the same tank the possible drops resulting from infusion of the coffee. This makes it possible to maintain the environment of the machine clean and to facilitate its cleaning.

The invention will be better understood from a study of the embodiments taken by way of nonlimiting example and illustrated by the attached figures in which:

FIG. 4 is an axial cross-sectional view of the part for connection of the reservoir with the corresponding part of the base of the machine.

Figure 1:
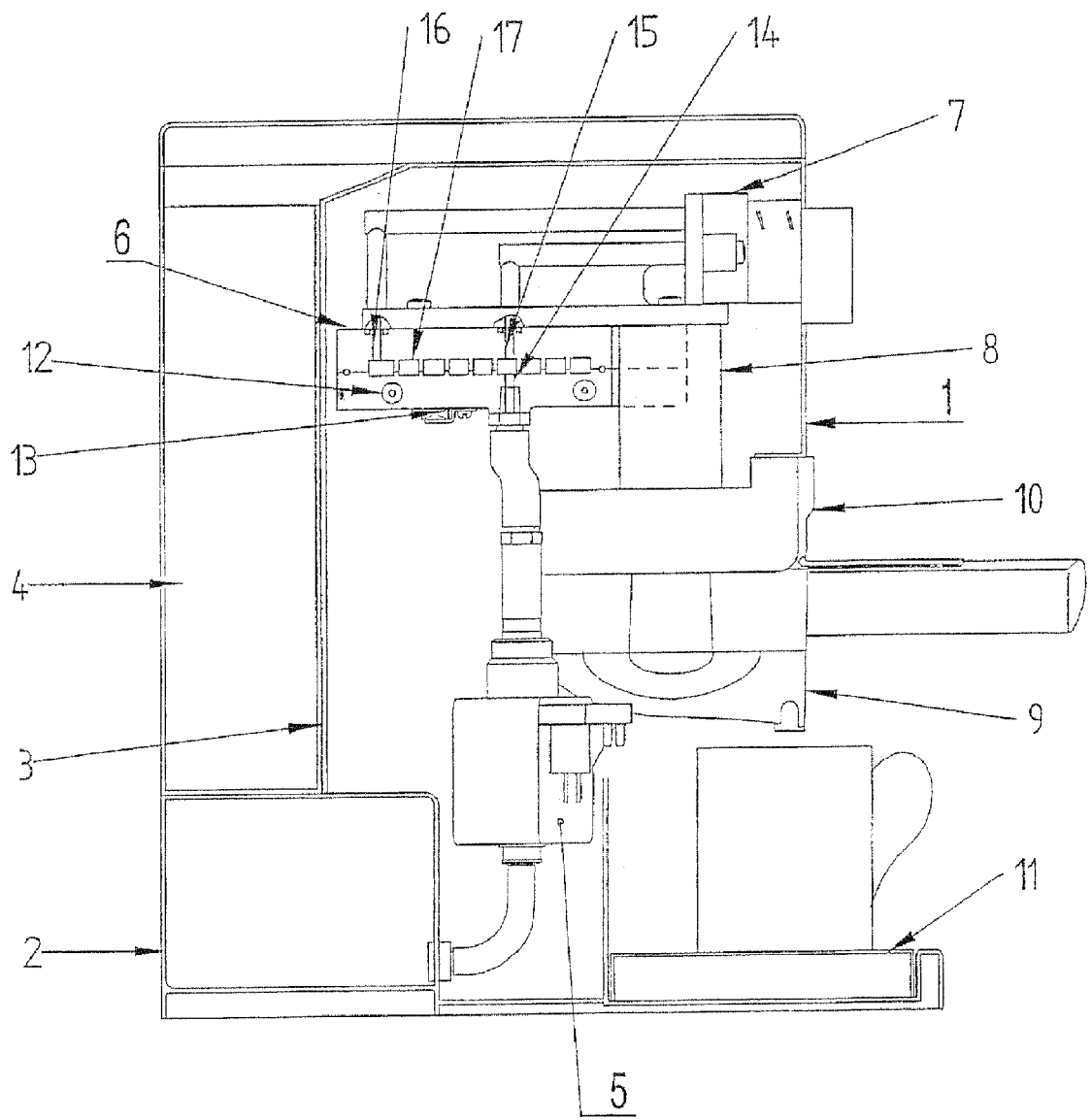
FIG. 1 represents a partial longitudinal cross-sectional view of a coffeemaker according to the invention.

FIG. 1 illustrates a coffeemaker according to the invention having a body 1 of which the lower part comprises a base 2 which is connected to the upper part of body 1 by a vertical upright 3 being used to support a cold water reservoir 4. Body 1 contains the hydraulic circuit of the machine having a pump 5 connected to reservoir 4, a heating unit 6, a distributor 7 and a jack 8 for compressing the coffee grounds.

The coffee grounds are placed in a cup provided with a filter wall called a filter holder 9 which is, in the example described, mounted slidably in a horizontal direction in the grooves of a fixed support of the infusion head 10.

Jack 8 has a sliding nose mounted to slide vertically relative to body 1 of the machine adapted to penetrate, during each cycle of operation, to the interior of filter holder 9 in order to compress the grounds.

The water provided by pump 5 operates the hydraulic actuating jack 8 which pushes the nose against the grounds. From a preset pressure value, a valve located inside of said nose permits the passage of water from heating unit 6 towards filter holder 9 from where the infusion flows into a collecting container located on a support 11 of base 2.

The coffeemaker has a boiler or heating unit 6 intended to heat water under pressure provided by pump 5 before injecting it into the coffee grounds of filter holder 9. Heating unit 6 comprises heat exchanger channels 17 allowing the circulation of water inside heating unit 6 which comprises moreover an electric heating element 12 and a temperature gauge 13. Water coming from pump 5 arrives by an input channel 14 of heating unit 6 and can flow out again along two paths of the latter, depending on the position of distributor 7. Either water leaves cold by an output channel 15, which forms with the input channel 14 a very short circuit not permitting water to be heated in the heating unit, or water leaves hot by an output channel 16 after having circulated in heat exchanger channels 17 of heating unit 6.

At the end of the extraction of the coffee beverage, distributor 7 is brought back to its rest position by the user, with the result that hot water under pressure of the hydraulic circuit is sent by a pressure reduction piping towards reservoir 4.

Figure 2:
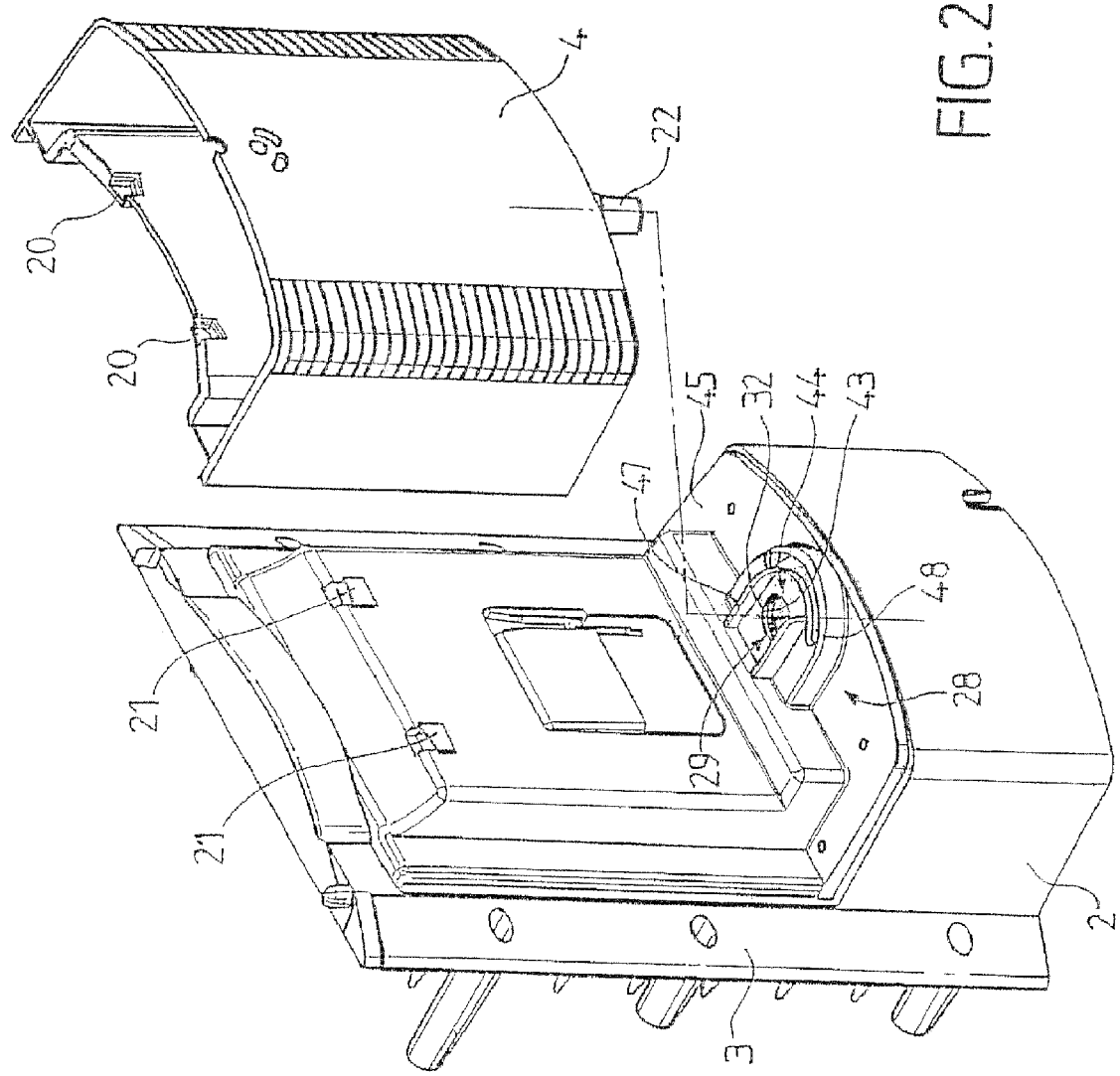
FIG. 2 is a perspective view of the back part of the machine with the water reservoir withdrawn from its seat and represented at the side.

Reservoir 4 is mounted in a removable manner on the machine of the invention and it has, such as visible in FIG. 2, fastening elements 20 which can engage in eyelets 21 provided for this purpose in the frontal wall facing vertical upright 3. Reservoir 4 has a generally parallelepipedic form open at its upper part to facilitate its filling and closed at its lower part by a valve 23 (FIG. 4) located inside a column 22. Valve 23 is normally closed under the action of a return spring 24 which maintains its upper part 23 supported against the bottom of reservoir 4 by interposition of a sealing washer 26. When reservoir 4 is installed, column 22 rests in a bore 29 of base 2, means being provided in the base to open valve 23 and to put liquid of reservoir 4 in communication with the conduits of the hydraulic circuit of the machine.

Figure 3:
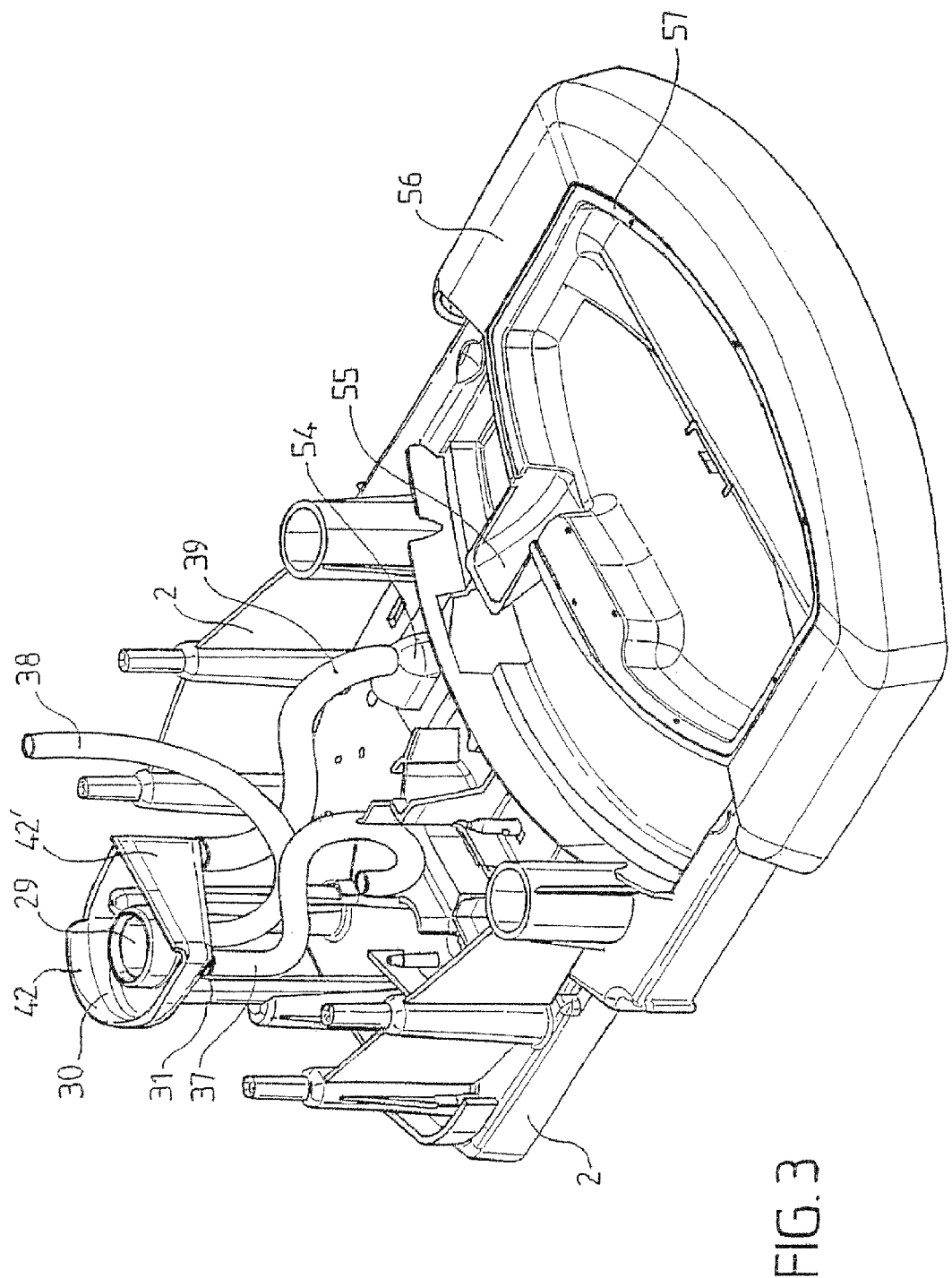
FIG. 3 represents a perspective view of the lower part of the base of the machine, part of the parts constituting the outer jacket of the machine being removed to facilitate visualization.

As seen more clearly in FIGS. 3 and 4, bore 29 is formed in a part of concave form called funnel 30 supported by attachment studs 31 on base 2 of the machine. The base of funnel 30 presents several openings for communication with the conduits of the hydraulic circuit of the machine. Thus, two openings 33 and 34, are formed at the bottom of bore 29, at one side and the other of the axis of the latter, and communicate one with a pressure reduction conduit 37 and the other with a conduit 38 of the principal circuit. A peripheral opening 35 is provided to place funnel 30 in communication with a waste conduit 39.

By conduit 38 of the principal circuit one understands a conduit that connects funnel 30, respectively reservoir 4, with pump 5, whereas by pressure reduction conduit 37 one understands a conduit that connects the outlet conduit of heating unit 6 to funnel 30. Waste conduit 39 connects, as for it, funnel 30 to a recuperation tank, as will be explained hereafter.

Conduits 37, 38 and 39 are flexible tubes, made for example of rubber, which are connected on vertical hollow nozzles forming said openings 33, 34 and 35, as is visible in FIG. 4. In the same manner, the opposite end of each conduit is placed in communication by connection elements of the same type with its respective element of the hydraulic circuit.

Bore 29 is defined by the internal diameter of a cylindrical wall 40 formed roughly in the center of funnel 30. As is more clearly shown in FIG. 3, funnel 30 has an oblong form presenting, along its principal axis, a curved frontal wall 42 and an opposite flat wall 42'.

Funnel 30 being a part of rather complex form, it can advantageously be made of a plastic by an injection molding technique.

The upper surface of cylindrical wall 40 (FIG. 4) has a groove 41 in which an O-ring 43 is placed. O-ring 43 is supported on the external surface of column 22 of reservoir 4 at the time of its installation on the coffeemaker, this ring having the role of ensuring a seal between reservoir 4 and bore 29 of cylindrical wall 40 of funnel 30, respectively between the reservoir 4 and the remainder of the hydraulic circuit of the machine. O-ring 43 is maintained in place by crenellations 46 of a plate 45.

Plate 45 is positioned above funnel 30 so as to close it at least partially, this plate 45 being fixed in its turn by attachment studs provided for this purpose in base 2. Plate 45 presents in its central part a through opening 29' located in the prolongation of bore 29 of cylindrical wall 40 of funnel 30 and having a diameter slightly greater than the diameter of the latter.

The internal surface of plate 45, which faces funnel 30, presents a crown provided with crenellations 46 bordering opening 29'. The solid part of these crenellations 46 has the role of maintaining in place the O-ring 43, whereas the cutouts located between two crenellations 46 form passages 32 having the role of placing the interior of bore 29 in communication with its circumference, thus with the peripheral part of funnel 30.

On the external part of plate 45, facing reservoir 4, are provided two guide ribs 47 parallel to one another, disposed to one side and the other of opening 29' while being perpendicular to frontal walls 42, 42'. Plate 45 presents, alongside ribs 47, an opening 48 that allows again, but at a higher level, communication with the peripheral part of funnel 30. By higher level one understands a level located downstream with respect to crenellations 46 in the direction of flow of the return flow of hot water towards the reservoir at the end of a cycle.

In addition and as represented in FIG. 4, at the bottom of bore 29 is fixed a vertical jet quelling unit 50 having a longitudinal axis coaxial with that of bore 29 and, respectively with that of column 22 of reservoir 4. The jet quelling unit has at its upper part a protruding deflector 51 that rests on lower part 25 of valve 23 in order to cause its opening at the time of installation of reservoir 4. The lower part of jet quelling unit 50 has several blades 52 arranged in an off center manner in alternation, one above the other, along the longitudinal axis of jet quelling unit 50.

As is visible in FIG. 4, two adjacent blades touch with part of their periphery the two opposite ends of the interior surface of bore 29, a zigzag path being thus formed between their free ends, this path emerging in opening 33 communicating with pressure reduction conduit 37. Blades 52 can have the shape of a disc or any other plane or irregular form adapted to the intended goal. Such an arrangement forces the water jet arriving through the bottom of bore 29 to have a sinuous course, by traveling along the baffles formed by the offset ends of blades 52, which causes the pressure loss or the pressure decrease of the water return jet towards the reservoir.

In reference on FIG. 3, one notices that waste conduit 39 leaves the bottom of funnel 30 and conducts the liquid collected by the latter towards a recuperator 55 located below a recuperator nozzle 54 and communicating with the latter, nozzle on which comes to be connected the waste conduit 39. Funnel 30 being elevated relative to recuperator 55, the liquid collected by funnel 30 flows quickly towards recuperator 55.

Recuperator 55 forms a body in common with a recuperation tank 56 of which it constitutes a prolongation in the form of a gutter. Recuperation tank 56 is advantageously removably mounted relative to body 1 of the machine and for this it presents a form folded under base 2. Recuperation tank 56 in addition presents an edge 57 on which is installed support 11 for a coffee cup, support that is in the form of a grid making it possible to collect in the same tank 56 possible flows resulting from infusion of the coffee.

In operation, when the coffeemaker arrives at the end of the cycle of extraction of the coffee, the user brings distributor 7 back to the rest position with the result that the hot water flow under pressure that is still in the hydraulic circuit at the exit heating unit 6, is sent by pressure reduction conduit 37 towards reservoir 4. Tn its path, this turbulent hot water flow is broken up by blades 52 of jet quelling unit 50 and it is channeled towards a zone provided for this purpose. This zone can be reservoir 4 when the latter is well installed so that it communicates in a fluid tight manner with bore 29 of funnel 30.

On the other hand, it during the return of the hot water flow towards reservoir 4, the user removes in an inopportune way reservoir 4, or also if he raises it slightly so that its valve 23 pushed by the return spring 24 closes the communication of reservoir 4 with funnel 30, the return flow will be channeled by the device of the invention towards the peripheral zone of funnel 30. This channeling is done through the cutouts located between crenellations 46 of plate 45 for a not very turbulent jet calmed by blades 52 of jet queller 50. If the return or pressure reduction flow is not sufficiently slowed down by jet quelling unit 50, it arrives on the upper face of plate 45 and the overflows are channeled again by channeling ribs 47 of plate 45 towards opening 48 and from here into funnel 30. From funnel 30, the overflows arrive by waste conduit 39 into recuperation tank 56 where they are stored before emptying the tank.

Other alternatives of realization of the invention can be envisioned without departing from the framework of its claims.

Thus, one can imagine that O-ring 43 is held by a groove formed in the internal wall of bore 29, the passage between bore 29 and funnel 30 in the absence of reservoir 4 being able to be provided by a space arranged between the upper edge of bore 29 and the internal face of plate 45.

In another alternative one can imagine that O-ring 43 is held by the wall of column 22 of reservoir 4. One can also envision a frontal seal between the base of column 22 of reservoir 4 and a corresponding surface of connection device 28.

In still another alternative, one can envision the use of other pressure reduction means, in particular in the form of flexible blades extending from a peripheral wall installed in the pressure reduction conduit or blades installed in the opening for communication with the pressure reduction conduit of the connection device of the reservoir.

The invention claimed is:

1. Espresso coffeemaker comprising: a removable reservoir (4); and a principal hydraulic circuit that includes a pump (5) connected to said reservoir for aspirating water from said reservoir (4), a heating unit (6) connected to receive the water from said pump, and a filter holder (9) for holding coffee grounds, said filter holder (9) being connected to receive water from said heating unit (6), said reservoir (4) being also connected to a pressure reduction conduit (37) for return of water leaving the heating unit in the form of a jet, characterized in that said coffeemaker further comprises a connection device (28) connecting said reservoir (4) with said principal hydraulic circuit and said pressure reduction conduit and having means for reducing the pressure of the water jet arriving by the pressure reduction conduit for return to the reservoir and means (44) for directing water arriving by the pressure reduction conduit towards a storage zone.

2. Coffeemaker according to claim 1, characterized in that the pressure reduction means direct the water jet in a direction other than that of a principal axis of the device (28) for connection of said reservoir (4) with the principal hydraulic circuit and the pressure reduction conduit of the machine.

3. Coffeemaker according to claim 1, characterized in that said connection device (28) has a central bore (29) placing it in communication at one side with said reservoir (4), at the other side the bore opening into two openings (33,34) one (34) communicating with the principal hydraulic circuit and the other (33) with the pressure reduction conduit, where said means for reducing the pressure of the water jet are arranged in the prolongation of the axis of the opening (33) that communicates with the pressure reduction conduit.

4. Coffeemaker according to claim 1, characterized in that said pressure reduction means comprise a plurality of parallel blades (52) arranged in alternation on a common axis (53).

5. Coffeemaker according to claim 4, characterized in that said common axis (53) has a deflector (51) located in the axis of the valve for closing the reservoir (4) when the latter is connected to the connection device (28).

6. Coffeemaker according to claim 1, characterized in that said means (44) for directing the water jet are arranged downstream of said means or reducing the pressure of the water jet in the direction of flow of the latter.

7. Coffeemaker according to claim 6, characterized in that said means (44) for directing the water have at least one passage placing the interior of the bore (29) of the connection device (28) in communication with a funnel (30) surrounding said bore (29).

8. Coffeemaker according to claim 7, characterized in that said means (44) for directing have a first passage (32) located downstream from an O-ring (43) effecting sealing between the reservoir (4) and the bore (29) of the connection device (28) as seen in the direction of flow of the water return jet towards the reservoir (4).

9. Coffeemaker according to claim 8, characterized in that said first passage (32) is provided between the upper part of the bore (29) and the internal face of a plate (45) affixed on the funnel (30).

10. Coffeemaker according to claim 9, characterized in that said means (44) for directing the water have a second passage in the form of an opening (48) formed in the plate (45), the opening (48) being located downstream from the first passage (32) as seen in the direction of flow of the water return jet towards the reservoir (4).

11. Coffeemaker according to claim 10, characterized in that said means (44) for directing the water comprise channeling ribs (47) located at one side and the other of an opening of the plate (45) communicating with the bore (29) of the connection device (28), the ribs arriving in proximity to the opening (48).

12. Coffeemaker according to claim 7, characterized in that said means (44) for directing the water communicate by an evacuation opening (35) of the funnel (30) with a removable recuperation tank (56) removably mounted in the machine.

13. Coffeemaker according to claim 12, characterized in that said recuperation tank (56) comprises a prolongation in the form of a gutter forming a recuperator (55) coming under a recuperator nozzle (54) to which is connected a waste conduit (39) of the funnel (30).

14. Coffeemaker according to claim 12, characterized in that said recuperation tank (56) maintains a support for an infusion collecting container.

15. Espresso coffeemaker presenting a removable reservoir (4), a pump (5) connected to aspirate water from said reservoir (4), a heating unit (6) connected to receive water from said pump (5) and a filter holder (9) for holding coffee grounds and connected to receive water from said heating unit (6), said reservoir (4) being also connected to a pressure reduction conduit (37) for return of water leaving the heating unit in the form of a jet, characterized in that said coffeemaker comprises a connection device (28) connecting said reservoir (4) with said pump (5) and said pressure reduction conduit and having means for reducing the pressure of the water jet arriving by the pressure reduction conduit for return to the reservoir and means (44) for directing water arriving by the pressure reduction conduit towards a storage zone.

* * * * *